(12) United States Patent
Yao et al.

(10) Patent No.: US 12,135,555 B2
(45) Date of Patent: Nov. 5, 2024

(54) METHOD FOR GENERATING TRANSFER PATH, ELECTRONIC DEVICE, AND COMPUTER STORAGE MEDIUM

(71) Applicant: Willand (Beijing) Technology Co., LTD., Beijing (CN)

(72) Inventors: Zhuo Yao, Beijing (CN); Degan Lin, Beijing (CN)

(73) Assignee: Willand (Beijing) Technology Co., LTD. (CN)

( * ) Notice: Subject to any disclaimer, the term of this patent is extended or adjusted under 35 U.S.C. 154(b) by 0 days.

(21) Appl. No.: 18/346,612

(22) Filed: Jul. 3, 2023

(65) Prior Publication Data

US 2024/0004393 A1 Jan. 4, 2024

(30) Foreign Application Priority Data

Jul. 4, 2022 (CN) .......................... 202210777638.0

(51) Int. Cl.
*G05D 1/00* (2024.01)
(52) U.S. Cl.
CPC ......... *G05D 1/0214* (2013.01); *G05D 1/0088* (2013.01)
(58) Field of Classification Search
None
See application file for complete search history.

(56) References Cited

U.S. PATENT DOCUMENTS

| | | | |
|---|---|---|---|
| 7,693,653 B2 * | 4/2010 | Hussain ................ | G01C 21/20 340/995.14 |
| 11,037,320 B1 | 6/2021 | Ebrahimi et al. | |

(Continued)

FOREIGN PATENT DOCUMENTS

| | | |
|---|---|---|
| CN | 103455847 A | 12/2013 |
| CN | 108227705 A | 6/2018 |

(Continued)

OTHER PUBLICATIONS

Huang et al., "A novel solution with rapid Voronoi-based coverage path planning in irregular environment for robotic mowing systems", International Journal of Intelligent Robotics and Applications, Aug. 31, 2021, pp. 558-575 (Year: 2021).*

(Continued)

*Primary Examiner* — Tamara L Weber
(74) *Attorney, Agent, or Firm* — Emerson, Thomson & Bennett, LLC; Roger D. Emerson; Peter R. Detorre

(57) ABSTRACT

A method for generating a transfer path includes: determining at least one to-be-traversed region through which an autonomous mobile mowing apparatus passes when moving from a start point to an end point; performing, for each of the to-be-traversed region, path search targeted for the shortest traveling path in the to-be-traversed region when the mowing apparatus moves from the start point to the end point, to determine a first intra-regional path corresponding to the to-be-traversed region; acquiring a second intra-regional path corresponding to at least one of the first intra-regional path, where the second intra-regional path is obtained by adding at least one to-be-traversed point to the corresponding first intra-regional path, the to-be-traversed point is randomly determined in the to-be-traversed region corresponding to the first intra-regional path, and the to-be-traversed point is located outside the first intra-regional path; and generating a random transfer path including each of the second intra-regional path.

12 Claims, 4 Drawing Sheets

(56) References Cited

U.S. PATENT DOCUMENTS

| | | | |
|---|---|---|---|
| 2016/0174459 A1 | 6/2016 | Balutis et al. | |
| 2018/0004217 A1 | 1/2018 | Biber et al. | |
| 2019/0346848 A1* | 11/2019 | Zhou | G05D 1/0268 |
| 2019/0369620 A1* | 12/2019 | Zhou | G05D 1/0225 |
| 2020/0379469 A1* | 12/2020 | Kameyama | G05D 1/0225 |
| 2021/0084812 A1* | 3/2021 | Matus | G05D 1/0219 |
| 2021/0089040 A1 | 3/2021 | Ebrahimi Afrouzi et al. | |
| 2022/0039313 A1* | 2/2022 | Morrison | A01D 34/008 |
| 2022/0091613 A1* | 3/2022 | Alban | A01D 34/008 |
| 2023/0071262 A1* | 3/2023 | Lundkvist | G05D 1/0265 |
| 2023/0292657 A1* | 9/2023 | Xu | G05D 1/0272 56/10.2 A |

FOREIGN PATENT DOCUMENTS

| | | |
|---|---|---|
| CN | 108256430 A | 7/2018 |
| CN | 108594811 A | 9/2018 |
| CN | 109634285 A | 4/2019 |
| CN | 112567958 A | 3/2021 |
| CN | 112584697 A | 3/2021 |
| CN | 112799395 A | 5/2021 |
| CN | 112799399 A | 5/2021 |
| CN | 113568400 A | 10/2021 |
| CN | 113625701 A | 11/2021 |
| CN | 113867329 A | 12/2021 |
| CN | 114600622 A | 6/2022 |
| WO | WO2011129728 A1 | 10/2011 |
| WO | WO2021169188 A1 | 9/2021 |
| WO | WO2021/228040 A1 | 11/2021 |

OTHER PUBLICATIONS

Maini et al., "Online Coverage Planning for an Autonomous Weed Mowing Robot With Curvature Constraints", IEEE Robotics and Automation Letters, vol. 7, No. 2, Apr. 2022, pp. 5445-5452 (Year: 2022).*

Jingyu Chen et al., Full Traversal Path Planning and System DesignofIntelligentLawnMowerBasedonHybrid Algorithm, ComputerScience, vol. 48, Issue S1., Jun. 2021.

Yang Liu et al.,Study on Path Planning of Intelligent Mower Based on UWB Location, 2019 7th International Conference on Robot Intelligence Technology and Applications (RiTA), Dec. 31, 2019.

* cited by examiner

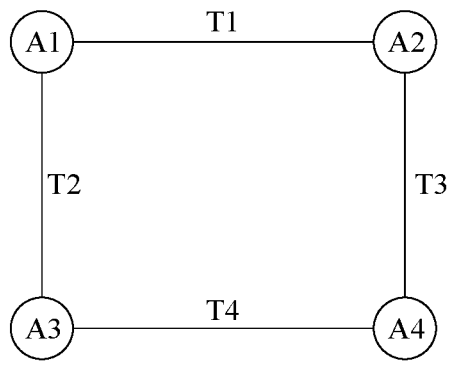

FIG. 3

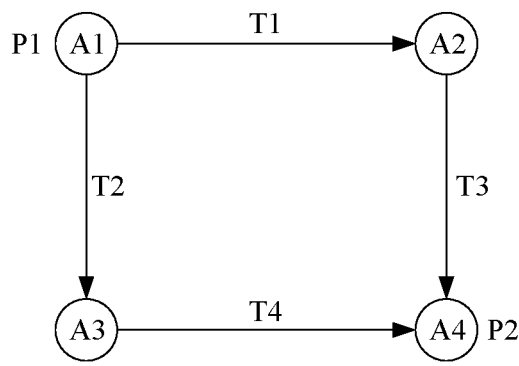

FIG. 4

| | |
|---|---|
| Respectively determining at least one straight path segment included in each first intra-regional path | 501 |

↓

| | |
|---|---|
| Randomly determining, for each of the straight path segment, a to-be-traversed point in a to-be-traversed region where the straight path segment is located at least once, and determining, when at least one to-be-traversed point is determined in a preset number threshold of times of determining the to-be-traversed point, and a polyline path segment obtained by adding the determined to-be-traversed point to the straight path segment intersects with neither an obstacle in nor a boundary line of the to-be-traversed region where the straight path segment is located, the straight path segment as a target straight path segment | 502 |

↓

| | |
|---|---|
| Replacing, for each of the first intra-regional path, in response to the first intra-regional path including at least one of the target straight path segment, each of the target straight path segment included in the first intra-regional path with the corresponding polyline path segment, to obtain a second intra-regional path corresponding to the first intra-regional path | 503 |

FIG. 5

METHOD FOR GENERATING TRANSFER PATH, ELECTRONIC DEVICE, AND COMPUTER STORAGE MEDIUM

CROSS REFERENCE TO RELATED APPLICATIONS

The present disclosure claims priority to Chinese Application No. 202210777638.0 filed on Jul. 4, 2022, and entitled "METHOD FOR GENERATING TRANSFER PATH, APPARATUS FOR GENERATING TRANSFER PATH, ELECTRONIC DEVICE, AND COMPUTER STORAGE MEDIUM," all of which are incorporated herein by reference in their entirety.

TECHNICAL FIELD

Embodiments of the present disclosure relate to the technical field of artificial intelligence, and in particular to, a method for generating a transfer path, an electronic device, and a computer storage medium.

BACKGROUND

As a fully automatic mechanical tool for trimming grass and vegetation, an autonomous mobile mowing apparatus is widely used in scenarios, such as landscaping, pruning, household trimming, and public grass trimming. A smart autonomous mobile mowing apparatus can autonomously complete trimming a lawn without direct manual control and operations, thereby reducing time occupation of labors. The autonomous mobile mowing apparatus needs to frequently go back and forth between two points, such as returning to a charging station after a mowing task is completed, leaving the charging station for a start point position of the work region, and transferring between different work regions.

At present, a transfer path of the autonomous mobile mowing apparatus between two points is generated by path search based on the shortest path planning method.

However, for two points between which the autonomous mobile mowing apparatus frequently runs back and forth, a same transfer path is generated each time by path search based on the shortest path planning method, and the autonomous mobile mowing apparatus will leave obvious marks on the lawn after running on the same transfer path many times, thereby affecting aesthetics of the lawn.

SUMMARY

In view of the above problems, embodiments of the present disclosure provide a method for generating a transfer path, an electronic device, and a computer storage medium, to at least solve the problem that an existing method for generating a transfer path affects aesthetics of a lawn.

According to a first aspect of embodiments of the present disclosure, a method for generating a transfer path is provided, including: determining a traveling start point and a traveling end point of an autonomous mobile mowing apparatus; determining at least one to-be-traversed region which the autonomous mobile mowing apparatus traverses when moving from the start point to the end point; performing, for each of the to-be-traversed region, path search targeted for the shortest traveling path in the to-be-traversed region when the autonomous mobile mowing apparatus moves from the start point to the end point, to determine a first intra-regional path corresponding to the to-be-traversed region; acquiring a second intra-regional path corresponding to at least one of the first intra-regional path, where the second intra-regional path is obtained by adding at least one to-be-traversed point to the corresponding first intra-regional path, the to-be-traversed point is randomly determined in the to-be-traversed region corresponding to the first intra-regional path, and the to-be-traversed point is located outside the first intra-regional path; and generating a random transfer path including each of the second intra-regional path for use as a transfer path of the autonomous mobile mowing apparatus from the starting point to the end point.

According to a second aspect of embodiments of the present disclosure, an apparatus for generating a transfer path is provided, including: a first determination module configured to determine a traveling start point and a traveling end point of position transfer of an autonomous mobile mowing apparatus; a second determination module configured to determine at least one to-be-traversed region through which the autonomous mobile mowing apparatus passes when moving from the start point to the end point; a third determination module configured to perform, for each of the to-be-traversed region, path search targeted for the shortest traveling path in the to-be-traversed region when the autonomous mobile mowing apparatus moves from the start point to the end point, to determine a first intra-regional path corresponding to the to-be-traversed region; a processing module configured to acquire a second intra-regional path corresponding to at least one of the first intra-regional path, where the second intra-regional path is obtained by adding at least one to-be-traversed point to the corresponding first intra-regional path, the to-be-traversed point is randomly determined in the to-be-traversed region corresponding to the first intra-regional path, and the to-be-traversed point is located outside the first intra-regional path; and a generation module configured to generate a random transfer path including each of the second intra-regional path for use as a transfer path of the autonomous mobile mowing apparatus from the starting point to the end point.

According to a third aspect of embodiments of the present disclosure, an electronic device is provided, including: a processor, a communication interface, a memory, and a communication bus, where the processor, the memory, and the communication interface complete communication with each other through the communication bus. The memory is configured to store at least one executable instruction, where the executable instruction causes the processor to perform corresponding operations of the method for generating a transfer path according to the first aspect of the present disclosure.

According to a fourth aspect of embodiments of the present disclosure, a computer storage medium is provided, where the computer storage medium stores a computer program therein, and the program, when executed by a processor, implements the method for generating a transfer path according to the first aspect of the present disclosure.

According to a fifth aspect of embodiments of the present disclosure, a computer program product is provided, where the computer program product includes a computer instruction, the computer instruction instructing a computing device to perform corresponding operations of the method for generating a transfer path according to the first aspect of the present disclosure.

According to the above technical schemes, after to-be-traversed regions which an autonomous mobile mowing apparatus traverses when moving from a start point to an end point are determined, a first intra-regional path corresponding to each of the to-be-traversed regions is determined through shortest path search, and then a randomly determined to-be-traversed point is added to at least one first intra-regional path to obtain a corresponding second intra-regional path, thereby generating a random transfer path including each of the second intra-regional path for use as a transfer path of the autonomous mobile mowing apparatus from the start point to the end point. Because the to-be-traversed point is randomly determined, the second intra-regional path is stochastic, so that when the autonomous mobile mowing apparatus runs back and forth between the start point and the end point many times, the transfer path on which the autonomous mobile mowing apparatus runs each time is stochastic, thereby preventing the autonomous mobile mowing apparatus from causing ruts on a lawn after running on a same transfer path many times, and ensuring aesthetics of the lawn.

BRIEF DESCRIPTION OF THE DRAWINGS

To more clearly describe technical schemes of embodiments of the present disclosure or existing technologies, drawings to be used in the description of the embodiments or the existing technologies will be briefly introduced below. Apparently, the drawings described below are some embodiments of the present disclosure. For those of ordinary skills in the art, other drawings may also be obtained based on these drawings without making creative work.

FIG. 3 is a schematic diagram of an undirected graph in an embodiment of the present disclosure;

FIG. 4 is a schematic diagram of a work region sequence in an embodiment of the present disclosure;

FIG. 5 is a flowchart of a method for acquiring a second intra-regional path in an embodiment of the present disclosure;

DETAILED DESCRIPTION OF EMBODIMENTS

To enable those in the present technical field to better understand schemes of the present disclosure, technical schemes of embodiments of the present disclosure will be clearly and completely described below with reference to the drawings in the embodiments of the present disclosure. Apparently, the described embodiments are some embodiments, instead of all embodiments, of the present disclosure. All other embodiments obtained by those of ordinary skills in the art based on the embodiments of the present disclosure without making creative work are encompassed in the scope of protection of the present disclosure.

For convenience of description and understanding, before the description of the method, a structure and a working scenario of the autonomous mobile mowing apparatus are briefly described as follows.

In the present embodiment, the autonomous mobile mowing apparatus may be an automatic mower. The automatic mower may be configured to trim a lawn to guarantee that grass height in the lawn satisfies requirements. In order to realize automatic grass cutting, the automatic mower mainly includes a housing; and a driving wheel assembly, a mowing knife assembly, a controller, a communication module, a sensor, and the like provided on the housing.

The driving wheel assembly can drive the housing and components thereon to move. The mowing knife assembly is used for cutting grass. The controller is connected with electric signals of, e.g., the driving wheel assembly, the mowing knife assembly, the communication module, and the sensor, respectively, to control and position the automatic mower.

The communication module may be a module capable of implementing wireless communication, such as WIFI, Bluetooth, or cellular data network, and may be used to perform data communication between the automatic mower and an external device.

The sensor can detect data of the automatic mower, thereby positioning the automatic mower. For example, the sensor on the automatic mower may include, but is not limited to, a built-in IMU (inertial navigation unit), a GPS (global positioning system), a magnetometer, a barometer, etc.

The method for generating a transfer path, the apparatus for generating a transfer path, the electronic device, and the storage medium provided in the embodiments of the present disclosure are described in detail below with reference to the drawings.

Method for Generating a Transfer Path

Figure 1:
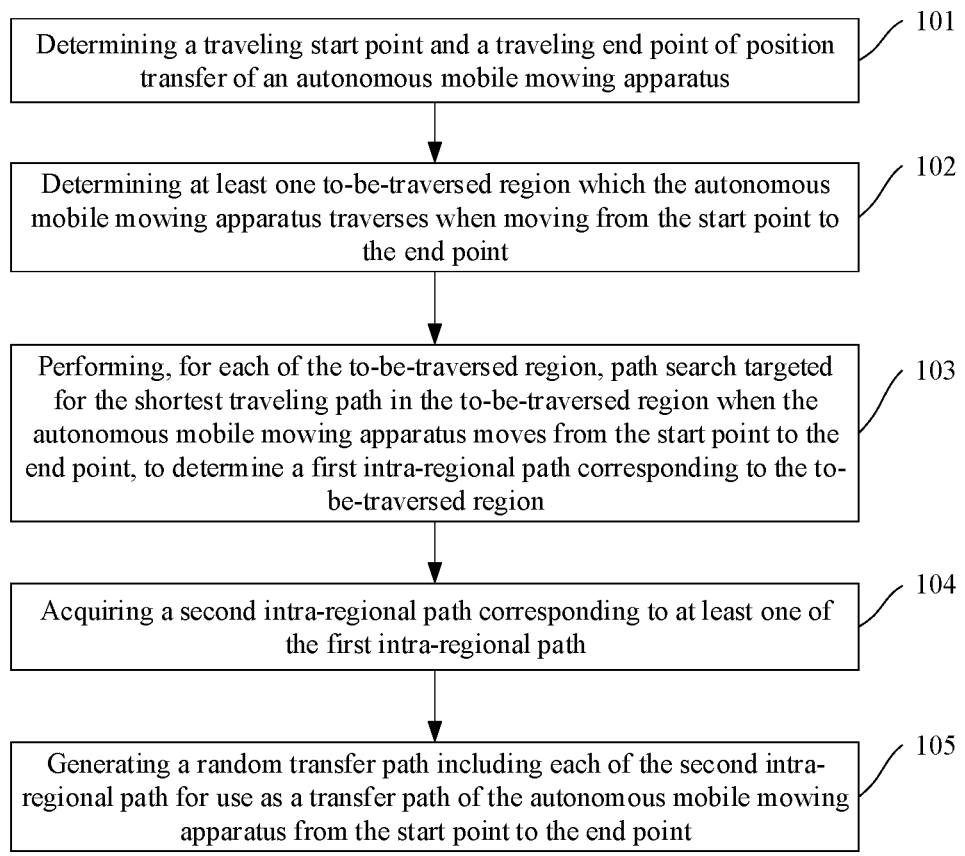
FIG. 1 is a flowchart of a method for generating a transfer path in an embodiment of the present disclosure.

FIG. 1 is a flowchart of a method for generating a transfer path in an embodiment of the present disclosure. As shown in FIG. 1, the method for generating a transfer path includes steps of:

Step 101: determining a traveling start point and a traveling end point of position transfer of an autonomous mobile mowing apparatus.

The autonomous mobile mowing apparatus may perform position transfer in the same work region, or may perform position transfer across different work regions. There may be one or more work regions. When there is a plurality of work regions, each of the work regions is connected with at least one other work region through a channel/path, and the autonomous mobile mowing apparatus may transfer/travel from one work region to another work region through the channel.

When the autonomous mobile mowing apparatus needs to perform position transfer, the traveling start point and the traveling end point of position transfer of the autonomous mobile mowing apparatus are determined. It should be understood that the position transfer of the autonomous mobile mowing apparatus in an embodiment of the present disclosure refers to position transfer of the autonomous mobile mowing apparatus in a non-mowing state, such as the position transfer of the autonomous mobile mowing apparatus when the autonomous mobile mowing apparatus returns to a charging station after completing a mowing task, the position transfer of the autonomous mobile mowing apparatus when the autonomous mobile mowing apparatus leaves the charging station for a start point position of mowing in a work region, or the position transfer of the autonomous mobile mowing apparatus when the autonomous mobile mowing apparatus transfers to a start point position of mowing in another work region after completing a mowing task in one work region.

Step 102: determining at least one to-be-traversed region which the autonomous mobile mowing apparatus traverses when moving from the start point to the end point.

During the movement of the autonomous mobile mowing apparatus from the start point to the end point, since the start point and the end point are both located in the work region, the autonomous mobile mowing apparatus will traverse at least one work region, and the work region which the autonomous mobile mowing apparatus traverses during the transfer process is a to-be-traversed region.

Step 103: performing, for each of the to-be-traversed region, path search targeted for the shortest traveling path in the to-be-traversed region when the autonomous mobile mowing apparatus moves from the start point to the end point, to determine a first intra-regional path corresponding to the to-be-traversed region.

For each to-be-traversed region, because there may be one or more obstacles in the to-be-traversed region, and the to-be-traversed region may be of an irregular shape, the shortest path in the to-be-traversed region when the autonomous mobile mowing apparatus moves from the start point to the end point may be searched using the shortest path algorithm, and the searched shortest path may be determined as the first intra-regional path corresponding to the to-be-traversed region.

When there is only one to-be-traversed region, i.e., the start point and the end point are located in the same work region, the shortest path between the start point and the end point is searched in the to-be-traversed region using the shortest path algorithm, and the search result is used as the first intra-regional path corresponding to the to-be-traversed region.

When there is a plurality of to-be-traversed regions, i.e., the start point and the end point are located in different work regions, for a to-be-traversed region where the start point is located, the shortest path between the start point and an exit for the autonomous mobile mowing apparatus is searched in the to-be-traversed region using the shortest path algorithm, and the search result is used as the first intra-regional path corresponding to the to-be-traversed region. For a to-be-traversed region where the end point is located, the shortest path between an entrance for the autonomous mobile mowing apparatus and the end point is searched in the to-be-traversed region using the shortest path algorithm, and the search result is used as the first intra-regional path corresponding to the to-be-traversed region. For a to-be-traversed region where neither the start point nor the end point is located, the shortest path between the entrance and the exit for the autonomous mobile mowing apparatus is searched in the to-be-traversed region using the shortest path algorithm, and the search result is used as the first intra-regional path corresponding to the to-be-traversed region.

It should be understood that the shortest path refers to a path searched using the shortest path algorithm, but may not be a path with the shortest distance. The shortest path algorithm may be, e.g., a Dijkstra algorithm, a Bellman-Ford algorithm, a Floyd algorithm, or a SPFA algorithm. For example, the shortest path algorithm is a Theta* algorithm.

Step 104: acquiring a second intra-regional path corresponding to at least one of the first intra-regional path.

The second intra-regional path/paths corresponding to some or all of the first intra-regional paths are acquired, i.e., each second intra-regional path has a corresponding first intra-regional path, and different second intra-regional paths correspond to different first intra-regional paths, so that the number of the second intra-regional paths is less than or equal to the number of the first intra-regional paths.

The second intra-regional path is obtained by adding at least one to-be-traversed point to the corresponding first intra-regional path, and the to-be-traversed point is randomly determined in the to-be-traversed region corresponding to the corresponding first intra-regional path, and the to-be-traversed point is located outside the corresponding first intra-regional path. Since the to-be-traversed point is randomly determined, the second intra-regional paths that are created corresponding to the same to-be-traversed region may be different when the autonomous mobile mowing apparatus transfers between the same start point and end point multiple times.

Step 105: generating a random transfer path including each of the second intra-regional path for use as a transfer path of the autonomous mobile mowing apparatus from the start point to the end point.

After at least one second intra-regional path is obtained, the random transfer path including each of the second intra-regional path is generated, and then the autonomous mobile mowing apparatus may transfer from the start point to the end point according to the random transfer path.

In an embodiment of the present disclosure, after to-be-traversed regions which the autonomous mobile mowing apparatus traverses when traveling/moving from the start point to the end point are determined, a first intra-regional path corresponding to each of the to-be-traversed regions is determined through shortest path search, and then a randomly determined to-be-traversed point is added to at least one first intra-regional path to obtain a corresponding second intra-regional path, thereby generating a random transfer path including each of the second intra-regional path for use as a transfer path of the autonomous mobile mowing apparatus from the start point to the end point. Because the to-be-traversed point is randomly determined, the second intra-regional path is stochastic, so that when the autonomous mobile mowing apparatus runs back and forth between the start point and the end point multiple times, the transfer path on which the autonomous mobile mowing apparatus runs each time is stochastic, thereby preventing the autonomous mobile mowing apparatus from causing ruts on a lawn after running on a same transfer path multiple times, and ensuring aesthetics of the lawn.

In a possible implementation, when a to-be-traversed region which the autonomous mobile mowing apparatus traverses when moving from the start point to the end point are determined, if the start point and the end point are located in the same work region, the work region where the start point and the end point are located is determined as the to-be-traversed region.

In an embodiment of the present disclosure, because all parts in the same work region are connected, when the start point and the end point are in the same work region, the autonomous mobile mowing apparatus can transfer from the start point to the end point only by moving in the work region where the start point and the end point are located, so that the work region where the start point and the end point are located can be determined as the to-be-traversed region, and the autonomous mobile mowing apparatus moves from the start point to the end point by position transfer in the work region where the start point and the end point are located, thereby ensuring position transfer speed of the autonomous mobile mowing apparatus, and reducing energy consumption of the autonomous mobile mowing apparatus during the position transfer.

In a possible implementation, when a to-be-traversed regions which the autonomous mobile mowing apparatus traverses when moving from the start point to the end point is determined, if the start point and the end point are located in different work regions, at least one work region sequence enabling the autonomous mobile mowing apparatus to move from the start point to the end point may be determined according to a connection relationship between the work regions. The work region sequence includes at least two sequentially connected work regions, a first work region in the work region sequence is a work region where the start point is located, and a last work region in the work region sequence is a work region where the end point is located. A target work region sequence is randomly determined from the determined work region sequences, and then work regions included in the target work region sequence are determined as to-be-traversed regions respectively.

There is a plurality of work regions, and the start point and the end point are located in different work regions. The work region where the start point is located may be directly connected with the work region where the end point is located, or may be indirectly connected with the work region where the end point is located through one or more other work regions, and may be connected with the work region where the end point is located through one or more channels, so that the autonomous mobile mowing apparatus can move from the start point to the end point through different work region sequences, and different work region sequences correspond to different transfer paths.

Different work region sequences may include different work regions, or may include same work regions in different orders of the work regions. For the two work region sequences including different work regions, the autonomous mobile mowing apparatus needs to move from the start point to the end point through different work regions during position transfer according to the two work region sequences respectively. For the two work region sequences including the same work regions in different orders of the work regions, the autonomous mobile mowing apparatus needs to move from the start point to the end point through different work regions in different orders during position transfer according to the two work region sequences respectively.

It should be understood that when only one work region sequence is determined, the work region sequence is determined as the target work region sequence, thereby ensuring generation of a transfer path enabling the autonomous mobile mowing apparatus to move from the starting point to the end point, ensuring completeness of the method for generating a transfer path, and further ensuring that the autonomous mobile mowing apparatus can run normally.

In an embodiment of the present disclosure, when the start point and the end point are located in different work regions, a plurality of work region sequences enabling the autonomous mobile mowing apparatus to move from the start point to the end point is determined according to a connection relationship between the work regions, then a target work region sequence is randomly determined from the work region sequences, and then each work region included in the target work region sequence is determined as a to-be-traversed region, i.e., the autonomous mobile mowing apparatus moves from the start point to the end point according to the target work region sequence. The work region sequence is a path of the autonomous mobile mowing apparatus transferring between work regions, and the target work region sequence is a work region sequence randomly determined from the work region sequences. Therefore, when the autonomous mobile mowing apparatus runs back and forth between the start point and the end point multiple times, the work region traversed during each running is stochastic, and not only is an intra-regional path is stochastic, but also an inter-regional path is stochastic, thereby preventing the autonomous mobile mowing apparatus from causing ruts on a lawn after repeatedly following the same transfer path between two points, and ensuring aesthetics of the lawn.

In a possible implementation, when the work region sequence is determined according to the connection relationship between the work regions, an undirected graph for indicating the connection relationship between the work regions may be established, and then at least one work region sequence enabling the autonomous mobile mowing apparatus to move from the start point to the end point is determined using a breadth-first search algorithm according to the established undirected graph.

Figure 2:
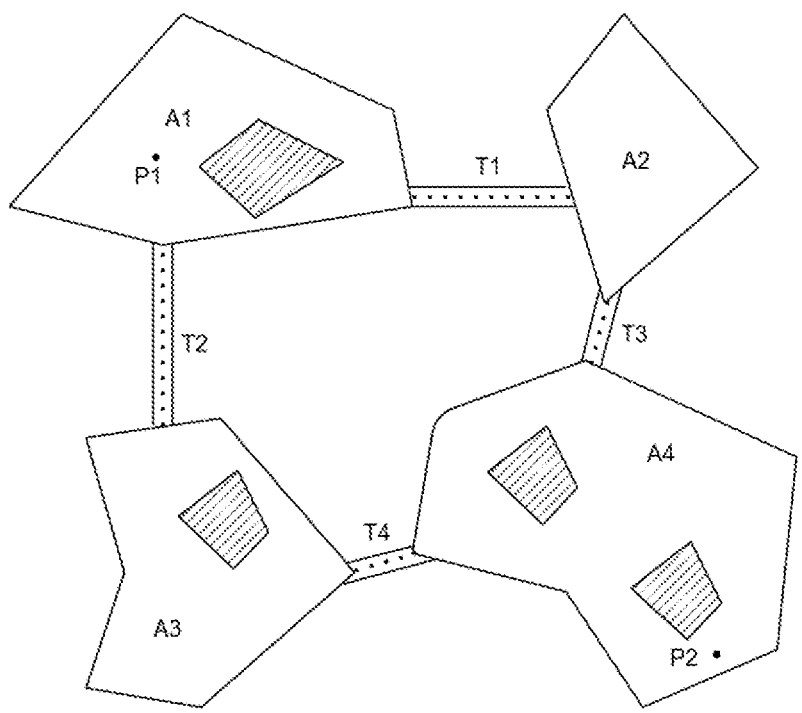
FIG. 2 is a schematic diagram of work regions in an embodiment of the present disclosure.

FIG. 2 is a schematic diagram of work regions in an embodiment of the present disclosure. As shown in FIG. 2, a work region A1 is connected with a work region A2 through a channel T1, the work region A2 is connected with a work region A4 through a channel T3, the work region A4 is connected with a work region A3 through a channel T4, and the work region A3 is connected with the work region A1 through a channel T2. A start point P1 and an end point P2 of position transfer of the autonomous mobile mowing apparatus are located in the work region A1 and the work region A2, respectively. In addition, shaded areas in FIG. 2 are used to represent obstacles in corresponding work regions.

FIG. 3 is a schematic diagram of an undirected graph in an embodiment of the present disclosure FIG. 3 shows an undirected graph corresponding to the work regions shown in FIG. 2. A connection relationship among the work region A1, the work region A2, the work region A3, and the work region A4 can be determined according to the undirected graph shown in FIG. 3.

When the autonomous mobile mowing apparatus needs to move from the start point P1 to the end point P2, the autonomous mobile mowing apparatus needs to move from the work region A1 to the work region A4, i.e., it is necessary to determine a connection mode between the work region A1 and the work region A4. According to the undirected graph established in FIG. 3, the connection mode between work region A1 and the work region A4 is searched using the breadth-first search algorithm, and two work region sequences as shown in FIG. 4 are determined, namely A1→T1→A2→T3→A4 and A1→T2→A3→T4→A4.

In an embodiment of the present disclosure, the undirected graph is established according to the connection relationship between the work regions, and then the work region sequence enabling the autonomous mobile mowing apparatus to move from the start point to the end point is searched in the undirected graph using the breadth-first search algorithm, thereby ensuring that all work region sequences enabling the autonomous mobile mowing apparatus to move from the start point to the end point can be searched, and not only ensuring that the autonomous mobile mowing apparatus can move from the start point to the end point, but also improving selectivity of the target work region sequence, so that the autonomous mobile mowing apparatus can move from the start point to the end point through different work region sequences, thus preventing the autonomous mobile mowing apparatus from causing ruts after following the same transfer path multiple times, avoiding non-uniform lawn generation caused by the ruts, and improving the aesthetics of the lawn, the work regions (especially connected work regions), and the regions near a charging station.

In a possible implementation, when the random transfer path including each second intra-regional path is generated, an inter-regional path of the autonomous mobile mowing apparatus when transferring between two adjacent work region in the target work region sequence can be acquired, and then the first intra-regional path or the second intra-regional path corresponding to each to-be-passed region can be spliced with each inter-regional path according to the target work region sequence to obtain the random transfer path.

The inter-regional path is determined based on channels connecting the work regions, and may be a straight path or a polyline path. As shown in FIG. 2, the work region A1 is connected with the work region A2 through the channel T1, so that an inter-regional path between the work region A1 and the work region A2 is determined based on the channel T1; the work region A2 is connected with the work region A4 through the channel T3, so that an inter-regional path between the work region A2 and the work region A4 is determined based on the channel T3; the work region A4 is connected with the work region A3 through the channel T4, so that an inter-regional path between the work region A4 and the work region A3 is determined based on the channel T4; and the work region A3 is connected with the work region A1 through the channel T2, so that an inter-regional path between the work region A3 and the work region A1 is determined based on the channel T2.

The inter-regional path can be pre-generated since the inter-regional path/channel between the work regions is narrow and its environment is complex. When the autonomous mobile mowing apparatus needs to transfer from one work region to another work region, the autonomous mobile mowing apparatus can transfer between the work regions according to the pre-generated inter-regional path for the two work regions.

It should be noted that two work regions may be connected with each other through one or more channels. When two work regions are connected with each other through a plurality of channels, there is a plurality of inter-regional paths between the two work regions, and each of the inter-regional paths corresponds to one channel between the two work regions.

The target work region sequence includes a plurality of sequentially arranged work regions, such as A1→A2→A4 and A1→A3→A4 in FIG. 4. The work region sequence indicates a transfer order of the autonomous mobile mowing apparatus between the work regions, and the two adjacent work regions in the work region sequence are two work regions through which the autonomous mobile mowing apparatus needs to pass sequentially during the position transfer.

It should be noted that when the first intra-regional path or the second intra-regional path corresponding to each to-be-traversed region is spliced with each inter-regional path according to the target work region sequence, if there is the corresponding second intra-regional path in the to-be-traversed region, the corresponding second intra-regional path is preferentially used for splicing with the inter-regional path; and if there is no corresponding second intra-regional path in the to-be-traversed region, the corresponding first intra-regional path is used for splicing with the inter-regional path.

In an embodiment of the present disclosure, the inter-regional path is a path of the autonomous mobile mowing apparatus when moving between the work regions, the intra-regional path is a path of the autonomous mobile mowing apparatus when moving in the work regions, and the target work region sequence indicates a transfer order of the autonomous mobile mowing apparatus between the work regions, so that the first intra-regional path or the second intra-regional path corresponding to each to-be-traversed region may be spliced with each inter-regional path according to the target work region sequence, to obtain the random transfer path enabling the autonomous mobile mowing apparatus to move from the start point to the end point, thereby ensuring that the autonomous mobile mowing apparatus can move safely from the start point to the end point according to the generated random transfer path, and ensuring the safety of position transfer of the autonomous mobile mowing apparatus.

FIG. 5 is a flowchart of a method for acquiring a second intra-regional path in an embodiment of the present disclosure. As shown in FIG. 5, the method for acquiring a second intra-regional path includes steps of:

Step 501: respectively determining at least one straight path segment included in each first intra-regional path.

The first intra-regional path is a path of the autonomous mobile mowing apparatus moving in a work region as determined using the shortest path algorithm. The first intra-regional path includes one or more straight path segments, where the straight path segment is a path segment in the form of a straight line. When the first intra-regional path only includes one straight path segment, the first intra-regional path is a straight path. When the first intra-regional path includes a plurality of straight path segments, the straight path segments included in the first intra-regional path are sequentially connected end to end.

Figure 6:
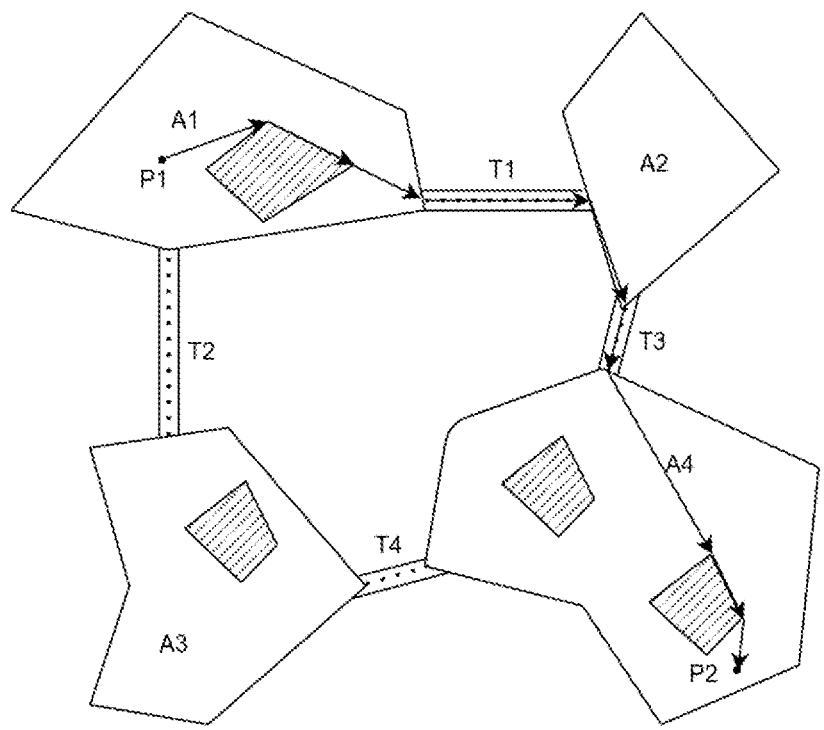
FIG. 6 is a schematic diagram of a first intra-regional path in an embodiment of the present disclosure.

FIG. 6 is a schematic diagram of a first intra-regional path in an embodiment of the present disclosure. As shown in FIG. 6, the target work region sequence is A1→A2→A4, i.e., when the autonomous mobile mowing apparatus transfers from the start point P1 to the end point P2, the autonomous mobile mowing apparatus first moves from the work region A1 where the start point P1 is located to the work region A2, and then moves from the work region A2 to the work region A4 where the end point P2 is located. The first intra-regional path corresponding to the work region A1 includes three straight path segments sequentially connected end to end, where a start point of the first straight path segment is the start point P1, and an end point of the third straight path segment is an entrance of the channel T1. The first intra-regional path corresponding to the work region A2 only includes a straight path segment, a start point of which is an exit of the channel T2, and an end point of which is an entrance of the channel T3. The first intra-regional path corresponding to the work region A4 includes three straight path segments sequentially connected end to end, where a start point of the first straight path segment is an exit of the channel T3, and an end point of the third straight path segment is the end point P2.

Step 502: randomly determining, for each of the straight path segment, a to-be-traversed point in a to-be-traversed region where the straight path segment is located at least once, and determining, when at least one to-be-traversed point is determined in a preset number threshold of times of determining the to-be-traversed point, and a polyline path segment obtained by adding the determined to-be-traversed point to the straight path segment intersects with neither an obstacle in nor a boundary line of the to-be-traversed region where the straight path segment is located, the straight path segment as a target straight path segment.

For each of the straight path segment, a to-be-traversed point is randomly determined in the to-be-traversed region where the straight path segment is located, the determined to-be-traversed point is added to the straight path to obtain the polyline path segment, and then whether the polyline path segment intersects with an obstacle in and a boundary of the to-be-traversed region where the straight path segment is located is determined. If the polyline path segment intersects with neither an obstacle in nor a boundary of the to-be-traversed region where the straight path segment is located, the to-be-traversed point is retained; while if the polyline path segment intersects with an obstacle in and a boundary of the to-be-traversed region where the straight path segment is located, a to-be-traversed point is randomly re-determined in the to-be-traversed region where the straight path segment is located. If the number of times of randomly determining the to-be-traversed point reaches the preset number threshold of times of determining the to-be-traversed point, but a retainable to-be-traversed point is still not found, the straight path segment will not be processed.

For each straight path segment, one or more to-be-traversed points on the straight path segment can be determined. When at least one retainable to-be-traversed point is determined, the straight path segment is determined as the target straight path segment, and the determined to-be-traversed point is added to the straight path segment to obtain a polyline path segment corresponding to the straight path segment. When the to-be-traversed point is added to the straight path segment, a start point of the straight path segment, each to-be-traversed point, and an end point of the straight path segment are sequentially connected to obtain the polyline path segment.

For example, for a straight path segment, a to-be-traversed point S3 is randomly determined in a to-be-traversed region where the straight path segment is located, and the to-be-traversed point S3 is added between the start point S1 and the end point S2 of the straight path segment. A connecting line between the start point S1 and the to-be-traversed point S3 intersects with neither an obstacle in nor a boundary line of the to-be-traversed region where the straight path segment is located, a connecting line between the to-be-traversed point S3 and the end point S2 intersects with neither an obstacle in nor a boundary line of the to-be-traversed region where the straight path segment is located, and then a polyline including the start point S1—the to-be-traversed point S3—the end point S2 is determined as the polyline path segment corresponding to the straight path segment.

The preset number threshold of times of determining the to-be-traversed point is a total number of times of determining the to-be-traversed point for a straight path segment. According to actual service requirements, an upper limit of to-be-traversed points may be set. If the number of determined to-be-traversed points satisfying requirements in the number threshold of times of determining the to-be-traversed point reaches the upper limit of to-be-traversed points, the random determination of the to-be-traversed point for the straight path segment is stopped. After the number of times of randomly determining the to-be-traversed point reaches the number threshold of times of determining the to-be-traversed point, the random determination of the to-be-traversed point for the straight path segment is stopped. If the upper limit of to-be-traversed points is set, an upper limit of the number of to-be-traversed points determined for a straight path segment is equal to the number threshold of times of determining the to-be-traversed point. For example, the upper limit of to-be-traversed points may be equal to, e.g., 1, 2, or 3, and the number threshold of times of determining the to-be-traversed point may be, e.g., 2, 3, or 5.

Step 503: replacing, for each of the first intra-regional path, in response to the first intra-regional path including at least one of the target straight path segment, each of the target straight path segment included in the first intra-regional path with the corresponding polyline path segment, to obtain a second intra-regional path corresponding to the first intra-regional path.

For each of the first intra-regional path, if the first intra-regional path includes at least one of the target straight path segment, each of the target straight path segment included in the first intra-regional path is replaced with the corresponding polyline path segment, to obtain the second intra-regional path corresponding to the first intra-regional path. When a random transfer path is subsequently generated, the second intra-regional path corresponding to the first intra-regional path is spliced with an inter-regional path. If the first intra-regional path does not include the target straight path segment, the first intra-regional path is not processed, and when the random transfer path is subsequently generated, the first intra-regional path is spliced with the inter-regional path.

Figure 7:
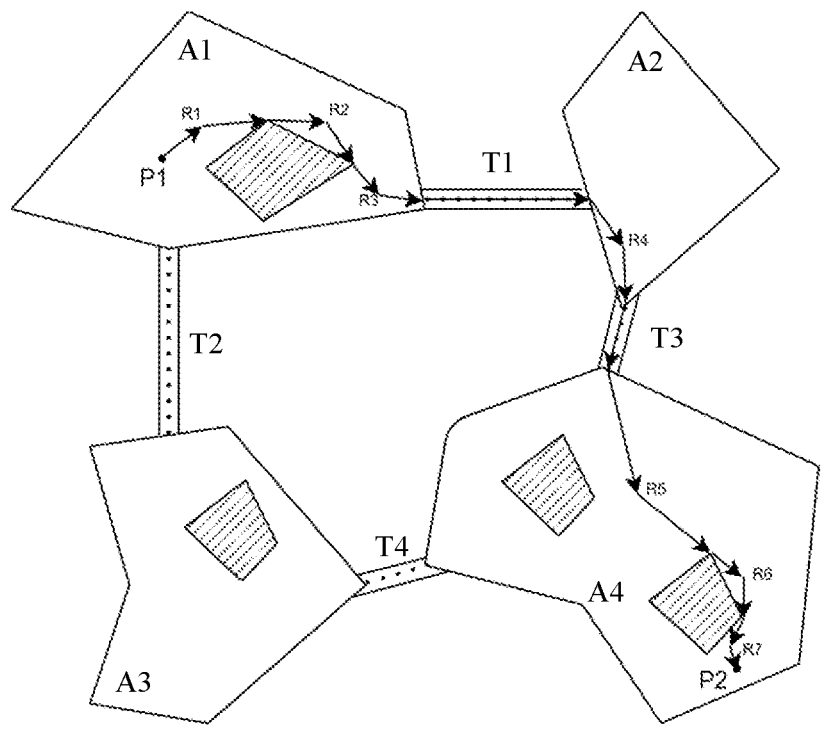
FIG. 7 is a schematic diagram of a random transfer path in an embodiment of the present disclosure.

FIG. 7 is a schematic diagram of a random transfer path in an embodiment of the present disclosure. As shown in FIG. 7, in the work region A1, a to-be-traversed point R1 is randomly determined for the first straight path segment, a to-be-traversed point R2 is randomly determined for the second straight path segment, and a to-be-traversed point R3 is randomly determined for the third straight path segment. In the work region A2, a to-be-traversed point R4 is determined for a unique straight path segment. In the work region A4, a to-be-traversed point R5 is randomly determined for the first straight path segment, a to-be-traversed point R6 is randomly determined for the second straight path segment, and a to-be-traversed point R7 is randomly determined for the third straight path segment.

In the work region A1, the first straight path segment in the work region A1 in FIG. 6 is replaced with a polyline path segment including the start point of the first straight path segment, the to-be-traversed point R1, and the end point of the first straight path segment, the second straight path segment in the work region A1 in FIG. 6 is replaced with a polyline path segment including the end point of the first straight path segment, the to-be-traversed point R2, and the end point of the second straight path segment, and the third straight path segment in the work region A1 in FIG. 6 is replaced with a polyline path segment including the end point of the second straight path segment, the to-be-traversed point R3, and the end point of the third straight path segment.

In the work region A2, a unique straight path segment in the work region A2 in FIG. 6 is replaced with a polyline path segment including a start point of the unique straight path segment, the to-be-traversed point R4, and an end point of the unique straight path segment.

In the work region A4, the first straight path segment in the work region A4 in FIG. 6 is replaced with a polyline path segment including the start point of the first straight path segment, the to-be-traversed point R5, and the end point of the first straight path segment, the second straight path segment in the work region A4 in FIG. 6 is replaced with a polyline path segment including the end point of the first straight path segment, the to-be-traversed point R6, and the end point of the second straight path segment, and the third straight path segment in the work region A4 in FIG. 6 is replaced with a polyline path segment including the end point of the second straight path segment, the to-be-traversed point R7, and the end point of the third straight path segment.

A straight path segment is replaced with a polyline path segment, to process the first intra-regional path in the work region A1 in FIG. 6 into a second intra-regional path in the work region A1 in FIG. 7, process the first intra-regional path in the work region A2 in FIG. 6 into a second intra-regional path in the work region A2 in FIG. 7, and process the first intra-regional path in the work region A4 in FIG. 6 into a second intra-regional path in the work region A4 in FIG. 7. As shown in FIG. 7, the second intra-regional path in the work region A1, an inter-regional path corresponding to the channel T1, the second intra-regional path in the work region A2, an inter-regional path corresponding to the channel T3, and the second intra-regional path in the work region A4 are sequentially spliced to obtain the random transfer path.

In an embodiment of the present disclosure, each first intra-regional path includes one or more straight path segments, and a to-be-traversed point is randomly determined for each straight path segment. If there is a to-be-traversed point satisfying requirements, the determined to-be-traversed point is added to the straight path segment to obtain a polyline path segment, and a straight path segment with a to-be-traversed point satisfying requirements is determined as a target straight path segment. For the first intra-regional path including the target straight path segment, the target straight path segment in the first intra-regional path is replaced with a polyline path segment corresponding to the target straight path segment, to obtain the second intra-regional path corresponding to the first intra-regional path. When the random transfer path is generated, for a first intra-regional path with a corresponding second intra-regional path, the corresponding second intra-regional path is spliced with an inter-regional path; and for a first intra-regional path without a corresponding second intra-regional path, the first intra-regional path is directly spliced with an inter-regional path, thereby ensuring that not only can different random transfer paths be generated, but also the autonomous mobile mowing apparatus can generate a corresponding random transfer path during position transfer each time, and ensuring the completeness of the method for generating a transfer path.

In a possible implementation, when a to-be-traversed point is randomly determined in a to-be-traversed region where a straight path segment is located, for each straight path segment, if the number of times of randomly determining the to-be-traversed point for the straight path segment is less than the number threshold of times of determining the to-be-traversed point, and an (i−1)-th polyline path segment obtained by adding an (i−1)-th to-be-traversed point between an (i−2)-th to-be-traversed point and an end point of the straight path segment intersects with neither an obstacle in nor a boundary line of the to-be-traversed region where the straight path segment is located, an i-th to-be-traversed point is randomly determined in the to-be-traversed region where the straight path segment is located. i is a positive integer greater than or equal to 2, a 1st to-be-traversed point and the i-th to-be-traversed point are both located outside the straight path segment, and a 0-th to-be-traversed point is a start point of the straight path segment.

For a straight path segment, when the number of times of randomly determining the to-be-traversed point is less than the number threshold of times of determining the to-be-traversed point, the to-be-traversed point may be randomly determined in the corresponding to-be-traversed region for the straight path segment multiple times, and the number of determined to-be-traversed points is greater than or equal to 0 and is less than or equal to the number threshold of times of determining the to-be-traversed point.

After the to-be-traversed point is randomly determined, it is necessary to validate whether the to-be-traversed point satisfies requirements, i.e., whether the polyline path segment generated after the to-be-traversed point is added to the straight path segment intersects with an obstacle in and a boundary of the to-be-traversed region. If the polyline path segment intersects with an obstacle in or a boundary of the to-be-traversed region, the autonomous mobile mowing apparatus will have a collision when moving according to the polyline path segment. If it is validated that the to-be-traversed point satisfies the requirements, whether the number of times of randomly determining the to-be-traversed point is less than the number threshold of times of determining the to-be-traversed point is ascertained, and if the number of times of randomly determining the to-be-traversed point is less than the number threshold of times of determining the to-be-traversed point, a new to-be-traversed point is further randomly determined until the number of times of randomly determining the to-be-traversed point reaches the number threshold of times of determining the to-be-traversed point.

When whether a to-be-traversed point satisfies the requirements is validated, if the to-be-traversed point is a first determined to-be-traversed point, the to-be-traversed point is added between a start point and an end point of a straight path segment to obtain a polyline path segment; if the obtained polyline path segment intersects with neither an obstacle in and nor a boundary line of a to-be-traversed region, it is determined that the to-be-traversed point satisfies the requirements; and if the obtained polyline path segment intersects with an obstacle in and/or a boundary line of the to-be-traversed region, it is determined that the to-be-traversed point does not satisfy the requirements. If the to-be-traversed point is not the first determined to-be-traversed point, the to-be-traversed point is added between a last the to-be-traversed point satisfying the requirements and the end point of the straight path segment to obtain a polyline path segment; if the obtained polyline path segment intersects with neither an obstacle in and nor a boundary line of the to-be-traversed region, it is determined that the to-be-traversed point satisfies the requirements; and if the obtained polyline path segment intersects with an obstacle in and/or a boundary line of the to-be-traversed region, it is determined that the to-be-traversed point does not satisfy the requirements.

In an embodiment of the present disclosure, one or more to-be-traversed points may be randomly determined for each straight path segment, and each to-be-traversed point is added between the start point and the end point of the straight path segment to obtain a polyline path segment. When a plurality of to-be-traversed points is determined for a same straight path segment, the generated random transfer path may be more stochastic, so that the autonomous mobile mowing apparatus runs back and forth between two points on different transfer paths multiple times, thereby avoiding ruts caused by following the same transfer path multiple times, and preventing the ruts from affecting aesthetics of a lawn.

In a possible implementation, for each of the straight path segment, a distance between the 1st to-be-traversed point and the straight path segment is less than a preset distance threshold, a projection of the 1st to-be-traversed point on a straight line where the straight path segment is located is located on the straight path segment, a distance between a connecting line between the (i−1)-th to-be-traversed point and the end point of the straight path segment and the i-th to-be-traversed point is less than the distance threshold, and a projection of the i-th to-be-traversed point on a straight line where the (i−1)-th to-be-traversed point and the end point of the straight path segment are located is located between the (i−1)-th to-be-traversed point and the straight path segment.

Figure 8:
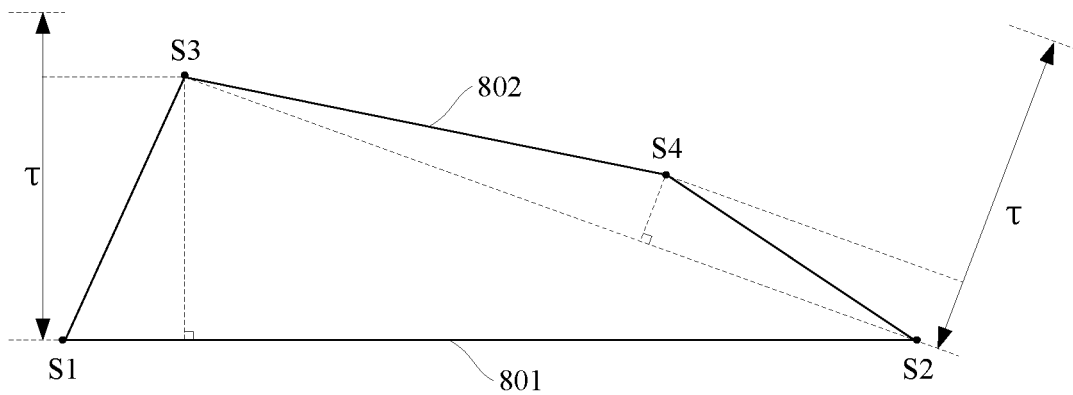
FIG. 8 is a schematic diagram of a to-be-traversed point in an embodiment of the present disclosure.

FIG. 8 is a schematic diagram of a to-be-traversed point in an embodiment of the present disclosure. As shown in FIG. 8, a to-be-traversed point S3 and a to-be-traversed point S4 are randomly determined for a straight path segment 801, where the to-be-traversed point S3 is a first to-be-traversed point determined for the straight path segment 801, and the to-be-traversed point S4 is a second to-be-traversed point determined for the straight path segment 801. A projection of the to-be-traversed point S3 on a straight line where the straight path segment 801 is located is located between a start point S1 and an end point S2 of the straight path segment 801, and a distance between the to-be-traversed point S3 and the straight path segment 801 is less than a preset distance threshold T. A projection of the to-be-traversed point S4 on a straight line where the to-be-traversed point S3 and the end point S2 are located is located on a connecting line between the to-be-traversed point S3 and the end point S2, and a distance from the to-be-traversed point S4 to the connecting line between the to-be-traversed point S3 and the end point S2 is less than the distance threshold T. The start point S1 of the straight path segment 801, the to-be-traversed point S3, the to-be-traversed point S4, and the end point S2 of the straight path segment 801 are sequentially connected to form a polyline path segment 802 corresponding to the straight path segment 801.

In an embodiment of the present disclosure, when the to-be-traversed point is randomly determined, the distance between the first to-be-traversed point and the straight path segment is less than the preset distance threshold, and a projection of the first to-be-traversed point on the straight path segment is located on the straight path segment; since the second to-be-traversed point, a distance between a to-be-traversed point and a connecting line between a last to-be-traversed point and the end point is less than the preset distance threshold, and a projection of the to-be-traversed point on the connecting line between the last to-be-traversed point and the end point is located on the connecting line between the last to-be-traversed point and the end point, so that not only is the transfer path randomized, but also the random transfer path has a shorter length, thereby ensuring that the autonomous mobile mowing apparatus can quickly complete position transfer, and reducing energy consumption of the autonomous mobile mowing apparatus during the position transfer.

Apparatus for Generating a Transfer Path

Figure 9:
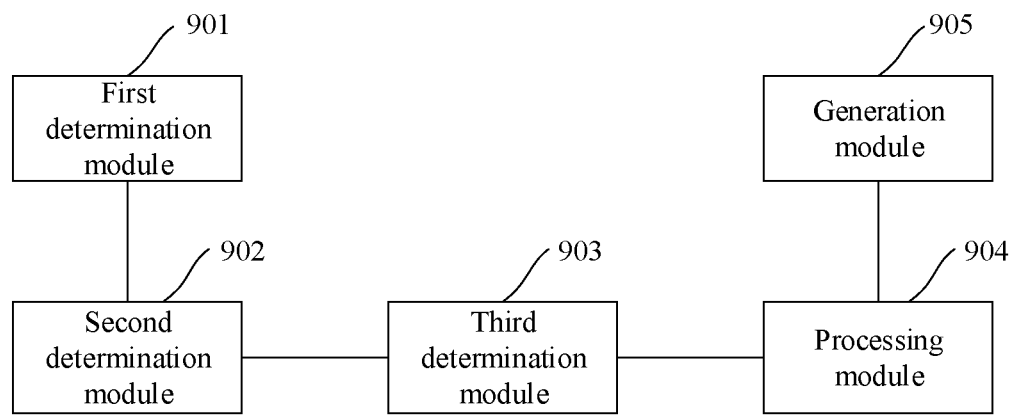
FIG. 9 is a schematic diagram of an apparatus for generating a transfer path in an embodiment of the present disclosure.

FIG. 9 is a schematic diagram of an apparatus for generating a transfer path in an embodiment of the present disclosure. As shown in FIG. 9, the apparatus for generating a transfer path includes:

a first determination module 901 configured to determine a start point and an end point of position transfer of the autonomous mobile mowing apparatus;

a second determination module 902 configured to determine at least one to-be-traversed region through which the autonomous mobile mowing apparatus passes when moving from the start point to the end point;

a third determination module 903 configured to perform, for each of the to-be-traversed region, path search targeted for the shortest traveling path in the to-be-traversed region when the autonomous mobile mowing apparatus moves from the start point to the end point, to determine a first intra-regional path corresponding to the to-be-traversed region;

a processing module 904 configured to acquire a second intra-regional path corresponding to at least one of the first intra-regional path, where the second intra-regional path is obtained by adding at least one to-be-traversed point to the corresponding first intra-regional path, the to-be-traversed point is randomly determined in the to-be-traversed region corresponding to the first intra-regional path, and the to-be-traversed point is located outside the first intra-regional path; and a generation module 905 configured to generate a random transfer path including each of the second intra-regional path for use as a transfer path of the autonomous mobile mowing apparatus from the start point to the end point.

In an embodiment of the present disclosure, the first determination module 901 can be used to execute step 101 in the above method embodiment, the second determination module 902 can be used to execute step 102 in the above method embodiment, the third determination module 903 can be used to execute step 103 in the above method embodiment, the processing module 904 can be used to execute step 104 in the above method embodiment, and the generation module 905 can be used to execute step 105 in the above method embodiment.

In a possible implementation, the second determination module 902 is used to determine, in response to the start point and the end point being located in a same work region, the work region where the start point and the end point are located as the to-be-traversed region.

In a possible implementation, the second determination module 902 is used to determine, in response to the start point and the end point being located in different work regions, at least one work region sequence according to a connection relationship between at least two work regions, where the work region sequence includes at least two sequentially connected work regions, a first work region in the work region sequence is a work region where the start point is located, and a last work region in the work region sequence is a work region where the end point is located; randomly determine a target work region sequence from the at least one work region sequence; and determine at least two work regions included in the target work region sequence respectively as the to-be-traversed regions.

In a possible implementation, the second determination module 902 is used to establish an undirected graph for indicating the connection relationship between the at least two work regions, and determine at least one work region sequence using a breadth-first search algorithm according to the undirected graph.

In a possible implementation, the generation module 905 is used to acquire an inter-regional path of the autonomous mobile mowing apparatus when transferring between two adjacent work regions in the target work region sequence, and splice the first intra-regional path or the second intra-regional path corresponding to each to-be-traversed region with each inter-regional path according to the target work region sequence to obtain the random transfer path.

In a possible implementation, the processing module 904 is used to respectively determine at least one straight path segment included in each of the first intra-regional path, where when the first intra-regional path includes a plurality of straight path segments, the straight path segments included in the first intra-regional path are sequentially connected end to end; randomly determine, for each of the straight path segments, a to-be-traversed point in the to-be-traversed region where the straight path segment is located at least once, and determine, when at least one to-be-traversed point is determined in a preset number threshold of times of determining the to-be-traversed point, and a polyline path segment obtained by adding the at least one to-be-traversed point to the straight path segment intersects with neither an obstacle in nor a boundary line of the to-be-traversed region where the straight path segment is located, the straight path segment as a target straight path segment, where the to-be-traversed point is located outside the straight path segment; and replace, for each of the first intra-regional path, in response to the first intra-regional path including at least one of the target straight path segment, each of the target straight path segment included in the first intra-regional path with the corresponding polyline path segment, to obtain the second intra-regional path corresponding to the first intra-regional path.

In a possible implementation, the processing module 904 is used to randomly determine, for each of the straight path segment, when the number of times of randomly determining the to-be-traversed point for the straight path segment is less than the number threshold of times of determining the to-be-traversed point, and an (i−1)-th polyline path segment obtained by adding an (i−1)-th to-be-traversed point between an (i−2)-th to-be-traversed point and an end point of the straight path segment intersects with neither an obstacle in nor a boundary line of the to-be-traversed region where the straight path segment is located, an i-th to-be-traversed point in the to-be-traversed region where the straight path segment is located, where i is a positive integer greater than or equal to 2, a 1st to-be-traversed point and the i-th to-be-traversed point are both located outside the straight path segment, and a 0-th to-be-traversed point is a start point of the straight path.

In a possible implementation, for each of the straight path segment, a distance between the 1st to-be-traversed point and the straight path segment is less than a preset distance threshold, and a projection of the 1st to-be-traversed point on a straight line where the straight path segment is located is located on the straight path segment; for each of the straight path segment, a distance between a connecting line between the (i−1)-th to-be-traversed point and the end point of the straight path segment and the i-th to-be-traversed point is less than the distance threshold, and a projection of the i-th to-be-traversed point on a straight line where the (i−1)-th to-be-traversed point and the end point of the straight path segment are located is located between the (i−1)-th to-be-traversed point and the straight path segment.

It should be noted that the interaction between the various modules in the above apparatus embodiments is based on the same inventive concept as the above method embodiments, and the description in the above method embodiments may be referred to for specific contents, which will not be repeated here.

Electronic Device

Figure 10:
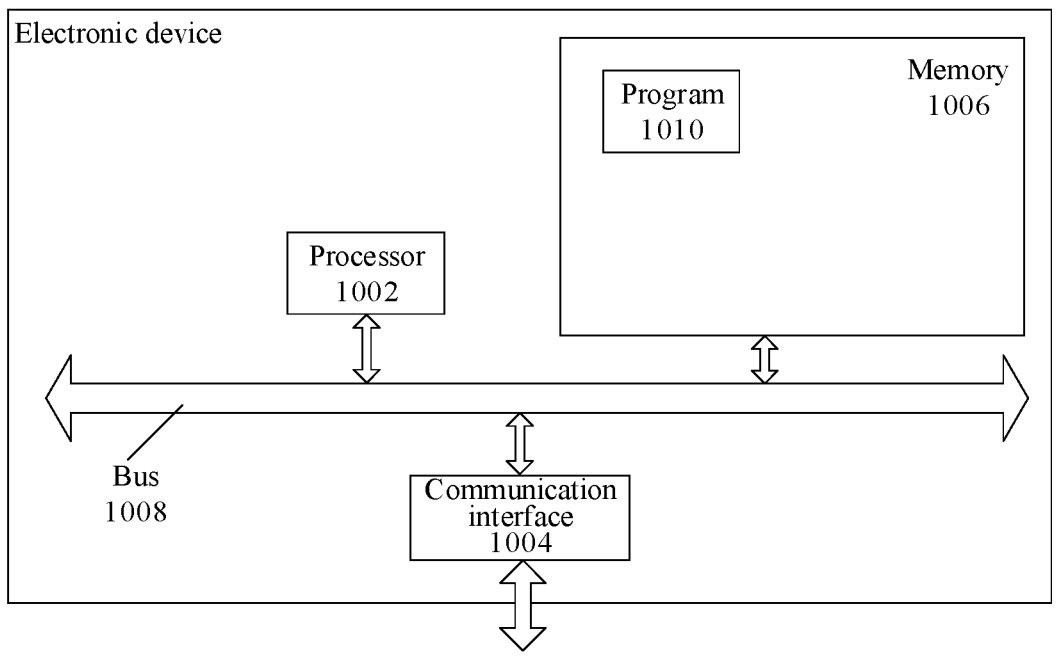
FIG. 10 is a schematic diagram of an electronic device in an embodiment of the present disclosure.

FIG. 10 is a schematic block diagram of an electronic device provided in an embodiment of the present disclosure. Specific embodiments of the present disclosure do not impose any limitation on specific implementations of the electronic device. As shown in FIG. the electronic device may include: a processor 1002, a communication interface 1004, a memory 1006, and a communication bus 1008, where:

the processor 1002, the communication interface 1004, and the memory 1006 complete communication with each other through the communication bus 1008, and the communication interface 1004 is configured to communicate with other electronic devices or servers.

The processor 1002 is configured to perform a program 1010, and specifically may perform relevant steps of the method for generating a transfer path in any one of the above embodiments.

Specifically, the program 1010 may include a program code. The program code includes computer operation instructions.

The processor 1002 may be a CPU, or an Application Specific Integrated Circuit (ASIC), or one or more integrated circuits configured to implement embodiments of the present disclosure. One or more processors included in a smart device may be processors of a same type, e.g., one or more CPUs; or may be processors of different types, e.g., one or more CPUs and one or more ASICs.

The memory 1006 is configured to store the program 1010. The memory 1006 may include a high-speed RAM memory, and may further include a non-volatile memory, e.g., at least one disk memory.

The program 1010 may specifically be used for causing the processor 1002 to perform the method for generating a transfer path in any one of the above embodiments.

Corresponding description in the corresponding steps and units of the method for generating a transfer path in any one of the above embodiments may be referred to for specific implementations of the steps in the program 1010, which will not be repeated here. Those skilled in the art can clearly understand that, for convenience and simplicity of description, the description of corresponding processes in the above method embodiments may be referred to for specific working processes of the above described device and modules, which will not be repeated here.

The electronic device in an embodiment of the present disclosure, after to-be-traversed regions through which the autonomous mobile mowing apparatus passes when moving from the start point to the end point are determined, determines a first intra-regional path corresponding to each of the to-be-traversed regions through shortest path search, and then adds a randomly determined to-be-traversed point to at least one first intra-regional path to obtain a corresponding second intra-regional path, thereby generating a random transfer path including each of the second intra-regional path for use as a transfer path of the autonomous mobile mowing apparatus from the start point to the end point. Because the to-be-traversed point is randomly determined, the second intra-regional path is stochastic, so that when the autonomous mobile mowing apparatus runs back and forth between the start point and the end point multiple times, the transfer path on which the autonomous mobile mowing apparatus runs each time is stochastic, thereby preventing the autonomous mobile mowing apparatus from causing ruts on a lawn after running on a same transfer path multiple times, and ensuring aesthetics of the lawn.

Computer Storage Medium

The present disclosure further provides a computer-readable storage medium storing instructions for causing a machine to perform the method for generating a transfer path as described herein. Specifically, a system or apparatus equipped with a storage medium may be provided, where the storage medium stores a software program code for implementing the functions of any one embodiment among the above embodiments, and makes a computer (or CPU or MPU) of the system or apparatus to read and perform the program code stored in the storage medium.

In this case, the program code read from the storage medium itself can implement the functions of any one embodiment among the above embodiments, and thus the program code and the storage medium storing the program code constitute a part of the present disclosure.

Examples of storage mediums for providing the program code include a floppy disk, a hard disk, a magneto-optical disk, an optical disk (e.g., CD-ROM, CD-R, CD-RW, DVD-ROM, DVD-RAM, DVD-RW, or DVD+RW), a magnetic tape, a non-volatile memory card, and a ROM. Alternatively, the program code may be downloaded from a server computer through a communication network.

Computer Program Product

An embodiment of the present disclosure further provides a computer program product, including a computer instruction, the computer instruction instructing a computing device to perform the corresponding operations in any one of the above method embodiments.

It should be noted that, depending on the implementation requirements, the components/steps described in the embodiments of the present disclosure may be split into more components/steps, or two or more components/steps or partial operations of the components/steps may be combined into novel components/steps to achieve the goal of the embodiments of the present disclosure.

The above method according to the embodiments of the present disclosure may be implemented in hardware or firmware, or be implemented as software or a computer code storable in a recording medium (such as a CD ROM, a RAM, a floppy disk, a hard disk, or a magneto-optical disk), or be implemented as a computer code that is downloaded from a network, is originally stored in a remote recording medium or a non-transitory machine-readable medium, and will be stored in a local recording medium, such that the method described herein may be processed by such software stored on a recording medium using a general-purpose computer, a special-purpose processor, or programmable or dedicated hardware (such as an ASIC or FPGA). It is understandable that a computer, a processor, a microprocessor controller, or programmable hardware includes a storage component (e.g., a RAM, a ROM, or a flash memory) that can store or receive software or a computer code. The method described herein is implemented when the software or the computer code is accessed and executed by the computer, the processor, or the hardware. Further, when a general purpose computer accesses the code for implementing the method shown herein, the execution of the code converts the general purpose computer to a special purpose computer configured to perform the method shown herein.

As will be appreciated by those of ordinary skills in the art, the various example units and method steps described in combination with the embodiments disclosed herein can be implemented by electronic hardware, or a combination of computer software and electronic hardware. Whether these functions are executed by hardware or software depends on specific applications and design constraints of the technical schemes. Those skilled in the art may implement the described functions for each specific application using different methods, but such implementation should not be considered as falling beyond the scope of the embodiments of the present disclosure.

The above embodiments are only used to illustrate the embodiments of the present disclosure, and are not intended to limit the embodiments of the present disclosure. Those of ordinary skills in the relevant technical field may further make various alterations and modifications without departing from the spirit and scope of the embodiments of the present disclosure. Therefore, all equivalent technical schemes are also encompassed in the scope of the embodiments of the present disclosure, and the scope of patent protection of the embodiments of the present disclosure should be defined by the appended claims.

What is claimed is:

1. A method for generating a transfer path, comprising:
   determining a traveling start point and a traveling end point of position transfer of an autonomous mobile mowing apparatus;
   determining at least one to-be-traversed region which the autonomous mobile mowing apparatus traverses when moving from the start point to the end point;
   performing, for each of the to-be-traversed region, path search targeted for a shortest traveling path in the to-be-traversed region when the autonomous mobile mowing apparatus moves from the start point to the end point, to determine a first intra-regional path based on the searched shortest traveling path corresponding to each of the to-be-traversed region;
   acquiring a second intra-regional path corresponding to at least one of the first intra-regional path, wherein the second intra-regional path is obtained by adding at least one to-be-traversed point to the corresponding first intra-regional path, the to-be-traversed point is randomly determined in the to-be-traversed region corresponding to the first intra-regional path, and the to-be-traversed point is located outside the first intra-regional path;
   generating a random transfer path comprising each of the second intra-regional path for use as a transfer path of the autonomous mobile mowing apparatus from the start point to the end point; and
   maneuvering the autonomous mobile mowing apparatus based on the random transfer path,
   wherein the determining at least one to-be-traversed region which the autonomous mobile mowing apparatus traverses when moving from the start point to the end point comprises:
      determining, in response to the start point and the end point being located in different work regions, at least one work region sequence according to a connection relationship between at least three work regions, wherein the work region sequence comprises at least three sequentially connected work regions, a first work region in the work region sequence is a work region where the start point is located, and a last work region in the work region sequence is a work region where the end point is located;
      randomly determining a target work region sequence from the at least one work region sequence; and
      determining the at least three work regions included in the target work region sequence respectively as the to-be-traversed regions,
   wherein the acquiring the second intra-regional path corresponding to at least one of the first intra-regional path comprises:
      respectively determining at least one straight path segment included in each of the first intra-regional path, wherein, when the first intra-regional path comprises a plurality of straight path segments, the straight path segments included in the first intra-regional path are sequentially connected end to end;
      randomly determining, at least once, for each of the straight path segments, a to-be-traversed point in the to-be-traversed region where the straight path segment is located, and determining, when at least one to-be-traversed point is determined within a preset threshold of times for determining the to-be-traversed point and a polyline path segment obtained by adding the at least one to-be-traversed point to the straight path segment intersects with neither an obstacle nor a boundary line of the to-be-traversed region where the straight path segment is located, the straight path segment as a target straight path segment, wherein the to-be-traversed point is located outside the straight path segment; and replacing, for each of the first intra-regional path, in response to the first intra-regional path comprising at least one of the target straight path segment, each of the target straight path segment included in the first intra-regional path with the corresponding polyline path segment, to obtain the second intra-regional path corresponding to the first intra-regional path, wherein the generating the random transfer path comprising each of the second intra-regional path comprises:

acquiring an inter-regional path when the autonomous mobile mowing apparatus transfers between two adjacent work region in the target work region sequence; and splicing each of the first intra-regional path for which no second intra-regional path is obtained and the second intra-regional path corresponding to each of the to-be-traversed region with each of the inter-regional path according to the target work region sequence, to obtain the random transfer path.

2. The method according to claim 1, wherein the determining the at least one work region sequence according to the connection relationship between the at least three work regions comprises:

establishing an undirected graph for indicating the connection relationship between the at least three work regions; and determining the at least one work region sequence according to the undirected graph using a breadth-first search algorithm.

3. The method according to claim 1, wherein the randomly determining, for each of the straight path segments, the to-be-traversed point in the to-be-traversed region where the straight path segment is located comprises:

randomly determining, for each of the straight path segment, when a number of times of randomly determining the to-be-traversed point for the straight path segment is less than the number threshold of times of determining the to-be-traversed point, and an (i−1)-th polyline path segment obtained by adding an (i−1)-th to-be-traversed point between an (i−2)-th to-be-traversed point and an end point of the straight path segment intersects with neither an obstacle in nor a boundary line of the to-be-traversed region where the straight path segment is located, an i-th to-be-traversed point in the to-be-traversed region where the straight path segment is located, wherein i is a positive integer greater than or equal to 2, a 1st to-be-traversed point and the i-th to-be-traversed point are both located outside the straight path segment, and a 0-th to-be-traversed point is a start point of the straight path.

4. The method according to claim 3, wherein for each of the straight path segment, a distance between the 1st to-be-traversed point and the straight path segment is less than a preset distance threshold, and a projection of the 1st to-be-traversed point on a straight line where the straight path segment is located is located on the straight path segment; and for each of the straight path segment, a distance between a connecting line between the (i−1)-th to-be-traversed point and the end point of the straight path segment and the i-th to-be-traversed point is less than the distance threshold, and a projection of the i-th to-be-traversed point on a straight line where the (i−1)-th to-be-traversed point and the end point of the straight path segment are located is located between the (i−1)-th to-be-traversed point and the end point of the straight path segment.

5. An electronic device, comprising: a processor, a communication interface, a memory, and a communication bus, wherein the processor, the memory, and the communication interface complete communication with each other through the communication bus; and the memory is configured to store at least one executable instruction, wherein the executable instruction causes the processor to perform a method for generating a transfer path, the method comprising:

determining a traveling start point and an end point of position transfer of an autonomous mobile mowing apparatus;

determining at least one to-be-traversed region which the autonomous mobile mowing apparatus traverses when moving from the start point to the end point;

performing, for each of the to-be-traversed region, path search targeted for a shortest traveling path in the to-be-traversed region when the autonomous mobile mowing apparatus moves from the start point to the end point, to determine a first intra-regional path based on the searched shortest traveling path corresponding to each of the to-be-traversed region;

acquiring a second intra-regional path corresponding to at least one of the first intra-regional path, wherein the second intra-regional path is obtained by adding at least one to-be-traversed point to the corresponding first intra-regional path, the to-be-traversed point is randomly determined in the to-be-traversed region corresponding to the first intra-regional path, and the to-be-traversed point is located outside the first intra-regional path;

generating a random transfer path comprising each of the second intra-regional path for use as a transfer path of the autonomous mobile mowing apparatus from the start point to the end point; and maneuvering the autonomous mobile mowing apparatus based on the random transfer path, wherein the determining at least one to-be-traversed region which the autonomous mobile mowing apparatus traverses when moving from the start point to the end point comprises:

determining, in response to the start point and the end point being located in different work regions, at least one work region sequence according to a connection relationship between at least three work regions, wherein the work region sequence comprises at least two sequentially connected work regions, a first work region in the work region sequence is a work region where the start point is located, and a last work region in the work region sequence is a work region where the end point is located;

randomly determining a target work region sequence from the at least one work region sequence; and determining the at least three work regions included in the target work region sequence respectively as the to-be-traversed regions, wherein the acquiring the second intra-regional path corresponding to at least one of the first intra-regional path comprises:

respectively determining at least one straight path segment included in each of the first intra-regional path, wherein, when the first intra-regional path comprises a plurality of straight path segments, the straight path segments included in the first intra-regional path are sequentially connected end to end;

randomly determining, at least once, for each of the straight path segments, a to-be-traversed point in the to-be-traversed region where the straight path segment is located, and determining, when at least one to-be-traversed point is determined within a preset threshold of times for determining the to-be-traversed point and a polyline path segment obtained by adding the at least one to-be-traversed point to the straight path segment intersects with neither an obstacle nor a boundary line of the to-be-traversed region where the straight path segment is located, the straight path segment as a target straight path segment, wherein the to-be-traversed point is located outside the straight path segment; and replacing, for each of the first intra-regional path, in response to the first intra-regional path comprising at least one of the target straight path segment, each of the target straight path segment included in the first intra-regional path with the corresponding polyline path segment, to obtain the second intra-regional path corresponding to the first intra-regional path, wherein the generating the random transfer path comprising each of the second intra-regional path comprises:

acquiring an inter-regional path when the autonomous mobile mowing apparatus transfers between two adjacent work region in the target work region sequence; and splicing each of the first intra-regional path for which no second intra-regional path is obtained and the second intra-regional path corresponding to each of the to-be-traversed region with each of the inter-regional path according to the target work region sequence, to obtain the random transfer path.

6. The electronic device according to claim 5, wherein the processor performs the determining the at least one work region sequence according to the connection relationship between the at least three work regions, comprising:

establishing an undirected graph for indicating the connection relationship between the at least three work regions; and determining the at least one work region sequence according to the undirected graph using a breadth-first search algorithm.

7. The electronic device according to claim 5, wherein the processor performs the randomly determining, for each of the straight path segments, the to-be-traversed point in the to-be-traversed region where the straight path segment is located, comprising:

randomly determining, for each of the straight path segment, when a number of times of randomly determining the to-be-traversed point for the straight path segment is less than the number threshold of times of determining the to-be-traversed point, and an (i−1)-th polyline path segment obtained by adding an (i−1)-th to-be-traversed point between an (i−2)-th to-be-traversed point and an end point of the straight path segment intersects with neither an obstacle in nor a boundary line of the to-be-traversed region where the straight path segment is located, an i-th to-be-traversed point in the to-be-traversed region where the straight path segment is located, wherein i is a positive integer greater than or equal to 2, a 1st to-be-traversed point and the i-th to-be-traversed point are both located outside the straight path segment, and a 0-th to-be-traversed point is a start point of the straight path.

8. The electronic device according to claim 7, wherein for each of the straight path segment, a distance between the 1st to-be-traversed point and the straight path segment is less than a preset distance threshold, and a projection of the 1st to-be-traversed point on a straight line where the straight path segment is located is located on the straight path segment; and for each of the straight path segment, a distance between a connecting line between the (i−1)-th to-be-traversed point and the end point of the straight path segment and the i-th to-be-traversed point is less than the distance threshold, and a projection of the i-th to-be-traversed point on a straight line where the (i−1)-th to-be-traversed point and the end point of the straight path segment are located is located between the (i−1)-th to-be-traversed point and the end point of the straight path segment.

9. A non-transitory computer storage medium, storing a computer program thereon, wherein the program, when executed by a processor, implements steps of:

determining a start point and an end point of position transfer of an autonomous mobile mowing apparatus;

determining at least one to-be-traversed region through which the autonomous mobile mowing apparatus passes when moving from the start point to the end point;

performing, for each of the to-be-traversed region, path search targeted for the shortest traveling path in the to-be-traversed region when the autonomous mobile mowing apparatus moves from the start point to the end point, to determine a first intra-regional path based on the searched shortest traveling path corresponding to each of the to-be-traversed region;

acquiring a second intra-regional path corresponding to at least one of the first intra-regional path, wherein the second intra-regional path is obtained by adding at least one to-be-traversed point to the corresponding first intra-regional path, the to-be-traversed point is randomly determined in the to-be-traversed region corresponding to the first intra-regional path, and the to-be-traversed point is located outside the first intra-regional path; and generating a random transfer path comprising each of the second intra-regional path for use as a transfer path of the autonomous mobile mowing apparatus from the start point to the end point; and maneuvering the autonomous mobile mowing apparatus based on the random transfer path, wherein the determining the at least one to-be-traversed region which the autonomous mobile mowing apparatus traverses when moving from the start point to the end point comprises:

determining, in response to the start point and the end point being located in different work regions, at least one work region sequence according to a connection relationship between at least three work regions, wherein the work region sequence comprises at least two sequentially connected work regions, a first work region in the work region sequence is a work region where the start point is located, and a last work region in the work region sequence is a work region where the end point is located;

randomly determining a target work region sequence from the at least one work region sequence; and determining the at least three work regions included in the target work region sequence respectively as the to-be-traversed regions, wherein the acquiring the second intra-regional path corresponding to at least one of the first intra-regional path comprises:

respectively determining at least one straight path segment included in each of the first intra-regional path, wherein, when the first intra-regional path comprises a plurality of straight path segments, the straight path segments included in the first intra-regional path are sequentially connected end to end;

randomly determining, at least once, for each of the straight path segments, a to-be-traversed point in the to-be-traversed region where the straight path segment is located, and determining, when at least one to-be-traversed point is determined within a preset threshold of times for determining the to-be-traversed point and a polyline path segment obtained by adding the at least one to-be-traversed point to the straight path segment intersects with neither an obstacle nor a boundary line of the to-be-traversed region where the straight path segment is located, the straight path segment as a target straight path segment, wherein the to-be-traversed point is located outside the straight path segment; and replacing, for each of the first intra-regional path, in response to the first intra-regional path comprising at least one of the target straight path segment, each of the target straight path segment included in the first intra-regional path with the corresponding polyline path segment, to obtain the second intra-regional path corresponding to the first intra-regional path, wherein the generating the random transfer path comprising each of the second intra-regional path comprises:

acquiring an inter-regional path when the autonomous mobile mowing apparatus transfers between two adjacent work region in the target work region sequence; and splicing each of the first intra-regional path for which no second intra-regional path is obtained and the second intra-regional path corresponding to each of the to-be-traversed region with each of the inter-regional path according to the target work region sequence, to obtain the random transfer path.

10. The storage medium according to claim 9, wherein the program, when executed by the processor, implements determining at least one work region sequence based on a connection relationship between at least three work regions, comprising:

establishing an undirected graph for indicating the connection relationship between the at least three work regions; and determining at least one work region sequence using a breadth-first search algorithm based on the established undirected graph.

11. The storage medium according to claim 9, wherein the processor performs the randomly determining, for each of the straight path segments, the to-be-traversed point in the to-be-traversed region where the straight path segment is located, comprising:

randomly determining, for each of the straight path segment, when a number of times of randomly determining the to-be-traversed point for the straight path segment is less than the number threshold of times of determining the to-be-traversed point, and an $(i-1)$-th polyline path segment obtained by adding an $(i-1)$-th to-be-traversed point between an $(i-2)$-th to-be-traversed point and an end point of the straight path segment intersects with neither an obstacle in nor a boundary line of the to-be-traversed region where the straight path segment is located, an i-th to-be-traversed point in the to-be-traversed region where the straight path segment is located, wherein i is a positive integer greater than or equal to 2, a 1st to-be-traversed point and the i-th to-be-traversed point are both located outside the straight path segment, and a 0-th to-be-traversed point is a start point of the straight path.

12. The storage medium according to claim 11, wherein, for each of the straight path segment, a distance between the 1st to-be-traversed point and the straight path segment is less than a preset distance threshold, and a projection of the 1st to-be-traversed point on a straight line where the straight path segment is located is located on the straight path segment; and for each of the straight path segment, a distance between a connecting line between the $(i-1)$-th to-be-traversed point and the end point of the straight path segment and the i-th to-be-traversed point is less than the distance threshold, and a projection of the i-th to-be-traversed point on a straight line where the $(i-1)$-th to-be-traversed point and the end point of the straight path segment are located is located between the $(i-1)$-th to-be-traversed point and the end point of the straight path segment.

\* \* \* \* \*